US012627145B2

(12) United States Patent
Zhou et al.

(10) Patent No.: US 12,627,145 B2
(45) Date of Patent: May 12, 2026

(54) MULTI-ENERGY INTEGRATED SHORT-TERM LOAD FORECASTING METHOD AND SYSTEM

(71) Applicant: Hefei University of Technology, Hefei (CN)

(72) Inventors: Kaile Zhou, Hefei (CN); Rong Hu, Hefei (CN)

(73) Assignee: Hefei University of Technology, Hefei (CN)

( * ) Notice: Subject to any disclaimer, the term of this patent is extended or adjusted under 35 U.S.C. 154(b) by 455 days.

(21) Appl. No.: 18/307,926

(22) Filed: Apr. 27, 2023

(65) Prior Publication Data

US 2024/0146057 A1 May 2, 2024

(30) Foreign Application Priority Data

Oct. 30, 2022 (CN) .......................... 202211341149.7

(51) Int. Cl.
*H02J 3/00* (2026.01)
*H02J 103/30* (2026.01)

(52) U.S. Cl.
CPC ........... *H02J 3/003* (2020.01); *H02J 2103/30* (2026.01)

(58) Field of Classification Search
CPC ........ G06F 16/2474; G06F 17/16; G06N 3/08
See application file for complete search history.

(56) References Cited

U.S. PATENT DOCUMENTS

2020/0333767 A1* 10/2020 Engelstein ............... H04Q 9/00
2023/0198258 A1* 6/2023 Shi ............................ H02J 3/06
700/291

FOREIGN PATENT DOCUMENTS

CN 111080032 A * 4/2020 ............. G06Q 50/06
CN 112529283 A * 3/2021 ............. G06N 3/044
CN 114266374 A * 4/2022

* cited by examiner

*Primary Examiner* — Mohammad Ali
*Assistant Examiner* — Dhruvkumar Patel

(57) ABSTRACT

The disclosure provides a multi-energy integrated short-term load forecasting method and system, which relates to the technical field of load forecasting. In the disclosure, after classifying the acquired relevant data of multi-energy integrated short-term load forecasting, the data after sample classification is used to train the multi-energy integrated short-term load forecasting model. The model is composed of multiple layers of temporal convolutional networks having multi-head self-attention mechanism and rotary position embedding. Finally, the trained model is used to carry out the multi-energy integrated short-term load forecasting. The disclosure can fully mine the coupling feature between multi-energy loads, improve the accuracy of multi-energy integrated short-term load forecasting, and further improve the management level and service efficiency of integrated energy demand side.

4 Claims, 2 Drawing Sheets

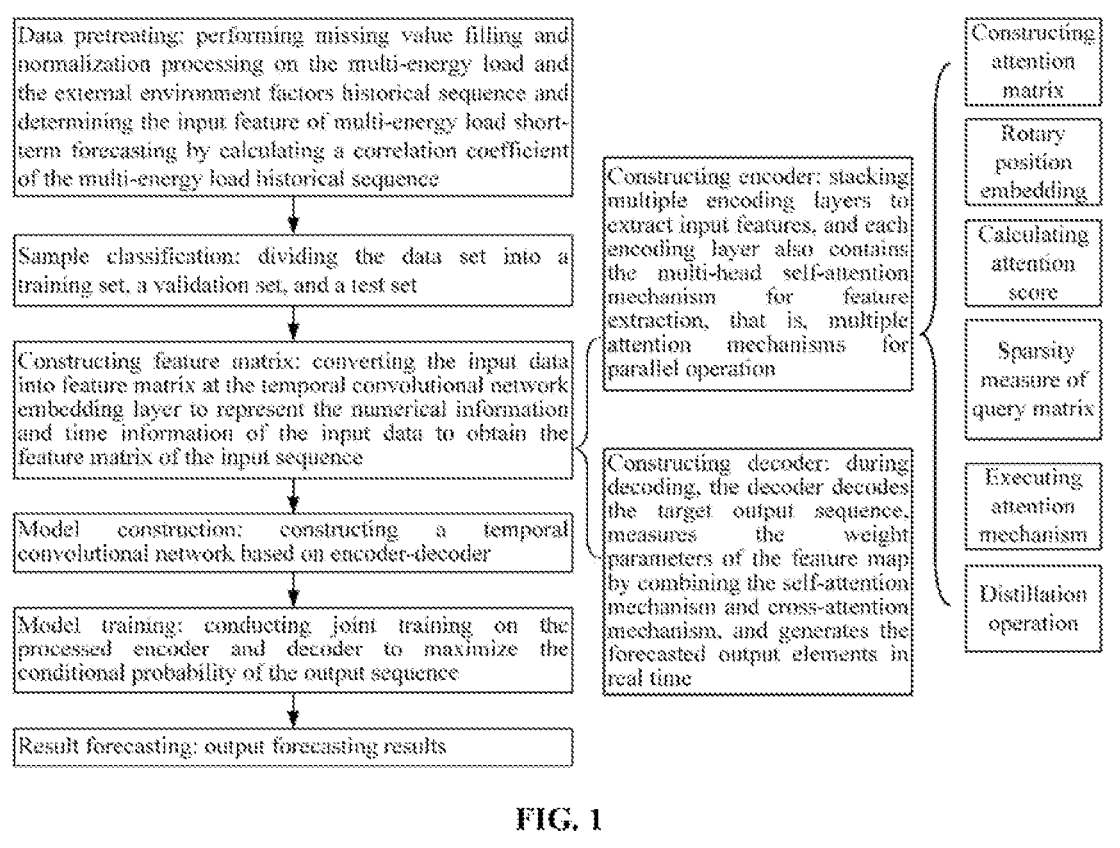

Data pretreating: performing missing value filling and normalization processing on the multi-energy load and the external environment factors historical sequence and determining the input feature of multi-energy load short-term forecasting by calculating a correlation coefficient of the multi-energy load historical sequence Sample classification: dividing the data set into a training set, a validation set, and a test set Constructing feature matrix: converting the input data into feature matrix at the temporal convolutional network embedding layer to represent the numerical information and time information of the input data to obtain the feature matrix of the input sequence Model construction: constructing a temporal convolutional network based on encoder-decoder Model training: conducting joint training on the processed encoder and decoder to maximize the conditional probability of the output sequence Result forecasting: output forecasting results Constructing encoder: stacking multiple encoding layers to extract input features, and each encoding layer also contains the multi-head self-attention mechanism for feature extraction, that is, multiple attention mechanisms for parallel operation Constructing decoder: during decoding, the decoder decodes the target output sequence, measures the weight parameters of the feature map by combining the self-attention mechanism and cross-attention mechanism, and generates the forecasted output elements in real time Constructing attention matrix Rotary position embedding Calculating attention score Sparsity measure of query matrix Executing attention mechanism Distillation operation

FIG. 1

MULTI-ENERGY INTEGRATED SHORT-TERM LOAD FORECASTING METHOD AND SYSTEM

CROSS REFERENCE TO RELATED APPLICATION

This patent application claims the benefit and priority of Chinese Patent Application No. CN 202211341149.7 filed on Oct. 30, 2022, the disclosure of which is incorporated by reference herein in its entirety as part of the present application.

TECHNICAL FIELD

The present disclosure relates to the technical field of load forecasting, and more specifically, to a multi-energy integrated short-term load forecasting method and system.

BACKGROUND ART

In order to meet the demand of green and low carbon, integrated energy systems (IESs) have gradually replaced the traditional independent planning and operation of single energy systems. At present, IESs are no longer limited to a single type of load, and it is needed to comprehensively consider multiple energy systems and develop multi-energy load forecasting methods. In IESs, all kinds of energy supply each other through complex coupling mechanism, which makes the factors affecting the demand of all kinds of loads in IESs more complex, and the balance between supply and demand of various kinds of energy becomes more difficult. The load forecasting of IESs is an important support for the operation management and optimal scheduling of IESs. It is of great significance and practical application value to carry out accurate multi-energy load forecasting of IESs.

At present, the load forecasting methods of IESs are mostly single-energy load forecasting. However, with the continuous development of the energy industry, the energy demand is affected by many factors (such as the actual environmental factors on the energy consumption side). Because the single-energy load forecasting method cannot fully mine the coupling feature between different loads, it cannot be directly applied to IESs multi-energy load forecasting. However, the existing multi-energy load short-term forecasting methods are mainly aimed at the load data itself, and lack of comprehensive consideration of the actual environmental factors on the energy consumption side, which cannot achieve accurate forecasting. In addition, the existing IESs load forecasting methods generally optimize the model parameters and structure, and still have some limitations in dealing with different forms of energy coupling problems. Because the coupling feature between different loads are ignored, these methods cannot be directly applied to multi-energy integrated short-term load forecasting. At the same time, due to the different sequence length between short-term load forecasting and ultra-short-term load forecasting, the current relatively mature ultra-short-term load forecasting methods (such as recurrent neural network, and long short-term memory) cannot be directly applied to short-term forecasting.

It can be seen that the existing technology cannot directly forecast the multi-energy integrated load in the short term, let alone accurately forecast.

SUMMARY

(1) Technical Problems to be Solved

In view of the shortcomings of the existing technology, the disclosure provides a multi-energy integrated short-term load forecasting method and system, which solves the problem that the existing technology cannot carry out short-term accurate forecasting on multi-energy integrated load.

(2) Technical Solutions

In order to achieve the above purpose, the following technical solutions of the present disclosure are adopted.

In a first aspect, the disclosure first provides a multi-energy integrated short-term load forecasting method, including:

performing pretreatment and correlation calculation on acquired relevant data of multi-energy integrated short-term load forecasting to determine input data of a multi-energy integrated short-term load forecasting model, and performing sample classification on the input data; wherein the relevant data of multi-energy integrated short-term load forecasting includes multi-energy load historical data and external environment historical data corresponding to the multi-energy load historical data;

acquiring a multi-energy integrated short-term load forecasting model constructed based on encoder-decoder, wherein the encoder includes multiple layers of temporal convolutional networks having multi-head self-attention mechanism and rotary position embedding; and training the multi-energy integrated short-term load forecasting model based on the input data after the sample classification, and performing the multi-energy integrated short-term load forecasting by using the trained multi-energy integrated short-term load forecasting model.

Preferably, the step of performing pretreatment and correlation calculation on acquired data related to multi-energy integrated short-term load forecasting to determine input data of a multi-energy integrated short-term load forecasting model, and performing sample classification on the input data includes:

performing pretreatment on the multi-energy load historical data and the external environment historical data by a pretreating operation including a missing value filling and normalization processing;

calculating a correlation coefficient of the described pretreated multi-energy load historical data sequence to determine the input data of the multi-energy integrated short-term load forecasting model; and dividing the pretreated and correlation-calculated input data into a training set, a validation set, and a test set.

Preferably, the step of calculating a correlation coefficient of a sequence of the described pretreated multi-energy load historical data to determine the input data of the multi-energy integrated short-term load forecasting model includes:

performing correlation evaluation through Pearson correlation coefficient, comparing a correlation inside the multi-energy load historical data sequence and a correlation between the multi-energy load historical data and the external environment historical data, if the correlation inside the multi-energy load historical data sequence is greater than the correlation between the multi-energy load historical data and the external environment historical data, using the multi-energy load historical data sequence as an input only; on the contrary, if the correlation inside the multi-energy load historical data sequence is greater than 0.2 but less than the correlation between the multi-energy load historical data and the external environment historical data, then using the multi-energy load historical data sequence and the external environment historical data sequence simultaneously as inputs of the multi-energy integrated short-term load forecasting.

Preferably, the step of acquiring an multi-energy integrated short-term load forecasting model constructed based on encoder-decoder, wherein the encoder includes multiple layers of temporal convolutional networks having multi-head self-attention mechanism and rotary position embedding includes:

S21. converting the input data of multi-energy integrated short-term load forecasting into a feature matrix;

S22. constructing the encoder by a temporal convolutional network having self-attention mechanism and rotary position embedding, and based on the encoder, mining a coupling feature of the input data of multi-energy integrated short-term load forecasting;

S23. eliminating a redundant feature in the coupling feature based on a distillation operation;

S24. constructing a decoder, wherein the decoder is arranged for obtaining an output data of multi-energy integrated short-term load forecasting after the coupling feature from which the redundant feature have been eliminated is decoded by the decoder.

Preferably, in S22, the step of constructing the encoder by a temporal convolutional network having self-attention mechanism and rotary position embedding, and based on the encoder, mining a coupling feature of the input data of multi-energy integrated short-term load forecasting includes:

S221. constructing an attention matrix based on the feature matrix, wherein the attention matrix includes query matrix, key matrix, and value matrix;

S222. adding rotary position embedding to the query matrix and the key matrix;

S223. calculating an attention score between the query matrix and the key matrix after adding rotary position embedding;

S224. updating the query matrix according to a sparsity measure of the query matrix to obtain an attention query matrix;

S225. executing an attention mechanism on the key matrix, the value matrix and the updated attention query matrix to mine the coupling feature of the input data of multi-energy integrated short-term load forecasting.

In a second aspect, the disclosure also provides a multi-energy integrated short-term load forecasting system, including:

a data acquisition module, configured to acquire relevant data of multi-energy integrated short-term load forecasting, wherein the relevant data of multi-energy integrated short-term load forecasting includes multi-energy load historical data and external environment historical data corresponding to the multi-energy load historical data;

a data pretreating module, configured to perform pretreatment and correlation calculation on acquired relevant data of multi-energy integrated short-term load forecasting to determine input data of a multi-energy integrated short-term load forecasting model, and perform sample classification on the input data;

a forecasting model construction module, configured to acquire a multi-energy integrated short-term load forecasting model constructed based on encoder-decoder; wherein the multi-energy integrated short-term load forecasting model includes a feature encoding module and a feature decoding module, the feature encoding module includes performing time feature encoding, sequence position feature encoding and data feature encoding on the input data, performing feature learning by encoded matrixes, and outputting a feature matrix; the feature decoding module is used to decode a load sequence needing to be forecasted by performing self-learning on a time sequence needing to be forecasted and performing cross learning on the time sequence and the feature matrix; the encoder includes multiple layers of temporal convolutional networks having multi-head self-attention mechanism and rotary position embedding;

a model training module, configured to train the multi-energy integrated short-term load forecasting model based on the input data after sample classification; and a forecasting result output module, configured to perform multi-energy integrated short-term load forecasting by the trained multi-energy integrated short-term load forecasting model and output a forecasting result.

Preferably, the step of the data pretreating module performing pretreatment and correlation calculation on acquired relevant data of multi-energy integrated short-term load forecasting to determine input data of a multi-energy integrated short-term load forecasting model, and performing sample classification on the input data includes:

performing pretreatment on the multi-energy load historical data and the external environment historical data by a pretreating operation including a missing value filling and normalization processing;

calculating a correlation coefficient of the described pretreated multi-energy load historical data sequence to determine the input data of the multi-energy integrated short-term load forecasting model; and dividing the pretreated and correlation-calculated input data into a training set, a validation set, and a test set.

Preferably, the step of calculating a correlation coefficient of a sequence of the described pretreated multi-energy load historical data to determine the input data of the multi-energy integrated short-term load forecasting model includes:

performing correlation evaluation through Pearson correlation coefficient, comparing a correlation inside the multi-energy load historical data sequence and a correlation between the multi-energy load historical data and the external environment historical data, if the correlation inside the multi-energy load historical data sequence is greater than the correlation between the multi-energy load historical data and the external environment historical data, using the multi-energy load historical data sequence as an input only; on the contrary, if the correlation inside the multi-energy load historical data sequence is greater than 0.2 but less than the correlation between the multi-energy load historical data and the external environment historical data, then using the multi-energy load historical data sequence and the external environment historical data sequence simultaneously as inputs of the multi-energy integrated short-term load forecasting.

Preferably, the feature encoding module executes steps S21-S23:

S21. converting the input data of multi-energy integrated short-term load forecasting into a feature matrix;

S22. constructing the encoder by a temporal convolutional network having self-attention mechanism and rotary position embedding, and based on the encoder, mining a coupling feature of the input data of multi-energy integrated short-term load forecasting;

S23. eliminating a redundant feature in the coupling feature based on a distillation operation;

the feature decoding module executes step S24:

S24. obtaining an output data of multi-energy integrated short-term load forecasting after the coupling feature from which the redundant feature has been eliminated is decoded by the decoder.

Preferably, in S22, the constructing the encoder by a temporal convolutional network having self-attention mechanism and rotary position embedding, and based on the encoder, mining a coupling feature of the input data of multi-energy integrated short-term load forecasting includes:

S221. constructing an attention matrix based on the feature matrix, wherein the attention matrix includes query matrix, key matrix, and value matrix;

S222. adding rotary position embedding to the query matrix and the key matrix;

S223. calculating an attention score between the query matrix and the key matrix after adding rotary position embedding;

S224. updating the query matrix according to a sparsity measure of the query matrix to obtain an attention query matrix;

S225. executing an attention mechanism on the key matrix, the value matrix and the updated attention query matrix to mine the coupling feature of the input data of multi-energy integrated short-term load forecasting.

(3) Beneficial Effects

The disclosure provides an multi-energy integrated short-term load forecasting method and system. Compared with the prior art, the disclosure has the following beneficial effects:

1. In the disclosure, after classifying the acquired relevant data of multi-energy integrated short-term load forecasting, the data after sample classification is used to train the constructed multi-energy integrated short-term load forecasting model with multiple layers of temporal convolutional networks having multi-head self-attention mechanism and rotary position embedding, and finally the trained model is used to carry out the multi-energy integrated short-term load forecasting. The disclosure can fully mine the coupling feature between multi-energy loads, improve the accuracy of multi-energy integrated short-term load forecasting, and further improve the management level and service efficiency of integrated energy demand side.

2. The disclosure uses multiple layers of temporal convolutional networks having multi-head self-attention mechanism and rotary position embedding to construct an encoder (and construct a decoder accordingly), and then construct a multi-energy integrated short-term load forecasting model. The model can fully mine coupling feature between multi-energy loads, solve the problem that the existing technology cannot carry out short-term accurate forecasting on multi-energy integrated load, and improve the accuracy of multi-energy load short-term forecasting.

3. The disclosure uses the correlation calculation as the selection index to determine the selection scheme of input features for the acquired relevant data of multi-energy integrated short-term load forecasting. By comparing the correlation coefficient between the multi-energy load and the environmental factors, the input features that can improve the multi-energy load short-term forecasting performance can be selected, and the accuracy of the multi-energy load short-term forecasting can be indirectly improved.

4. The disclosure extracts the coupling features between multi-energy loads and obtains the forecasting results of the multi-energy loads at one time. Compared with the single-energy load forecasting, it needs to build multiple forecasting models, and takes less time in the model training stage, so the method provided by the disclosure is more efficient.

5. The method of the disclosure not only realizes the short-term forecasting of multi-energy loads, but also can be applied on the ultra-short-term forecasting of multi-energy loads, with stronger universality.

BRIEF DESCRIPTION OF THE DRAWINGS

In order to explain the embodiments of the present disclosure or the technical solutions in the prior art more clearly, the following drawings that need to be used in the description of the embodiments or the prior art are briefly introduced. Obviously, the drawings in the following description are only embodiments of the present disclosure. For those of ordinary skill in the art, other drawings can be obtained based on the drawings disclosed without creative work.

FIG. 1 is an embodiment diagram of a multi-energy integrated short-term load forecasting method of the disclosure;

DETAILED DESCRIPTION OF THE EMBODIMENTS

Figure 2:
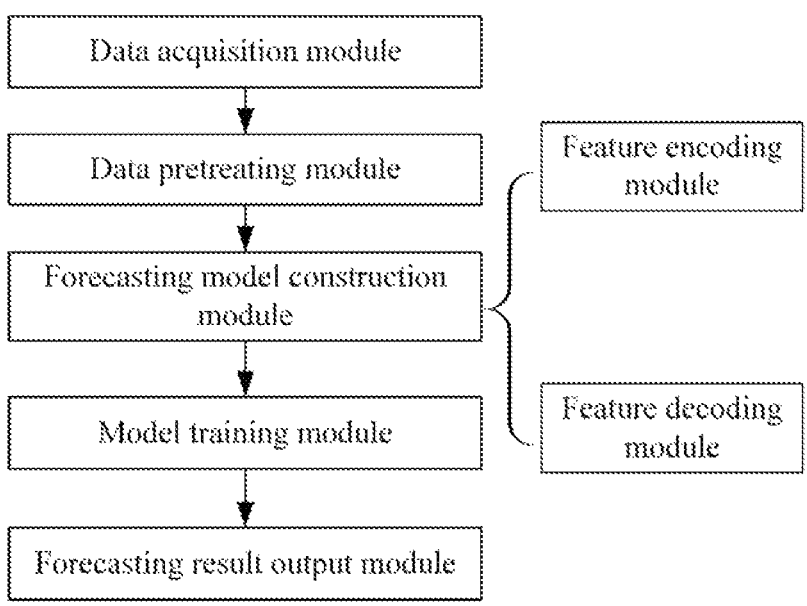
FIG. 2 is a structural diagram of a multi-energy integrated short-term load forecasting system in the embodiment of the disclosure.

In order to make the purpose, technical solutions and advantages of the embodiments of the disclosure clearer, the technical solutions of the embodiments of the present disclosure will be clearly and completely described below. Obviously, the described embodiments are only part of the embodiments of the present disclosure, not all of them. Based on the embodiments of the disclosure, all other embodiments made by those skilled in the art without any creative effort should fall within the protection scope of the disclosure.

By providing a multi-energy integrated short-term load forecasting method and system, the embodiments of the present disclosure solve the problem that the existing technology cannot carry out short-term accurate forecasting on multi-energy integrated load, realizes the purpose of efficiently forecasting multi-energy integrated load, and improves the management level and service efficiency of integrated energy demand side.

The technical solutions in the embodiments of the present disclosure are to solve the above technical problem. The overall idea is as follows:

In order to solve the problem that the existing technology cannot carry out the short-term accurate forecasting on multi-energy integrated load, the technical solutions of the present disclosure first preprocesses and calculates the correlation of the acquired data of multi-energy integrated short-term load forecasting to determine the selection scheme of the input data of multi-energy integrated short-term load forecasting. Therefore, the external environment historical data corresponding to the multi-energy load historical data that affects the forecasting accuracy is also scientifically and reasonably considered. Secondly, the encoder and decoder are constructed by using multiple layers of temporal convolutional networks having multi-head self-attention mechanism and rotary position embedding, so as to build a multi-energy integrated short-term load forecasting model. Finally, the multi-energy integrated short-term load forecasting model is trained by the relevant data corresponding to the selection scheme of the above input data, and the multi-energy integrated short-term load forecasting is carried out by the trained multi-energy integrated short-term load forecasting model. The disclosure uses the above technical solutions to improve the accuracy of the multi-energy integrated short-term load forecasting, thus achieving the purpose of improving the management level and service efficiency of the integrated energy demand side.

In order to better understand the technical solutions, the technical solutions will be described in detail with reference to the drawings in the specification and specific embodiments.

Embodiment 1

Integrated energy systems (IESs), as a new energy supply mode based on energy utilization, conversion and transmission technologies, realize flexible conversion, efficient distribution and organic coordination of various types of energy by coupling multiple energy forms such as electricity, gas, cold, heat, and water. In IESs, various types of energy are supplied complementarily through a complex coupling mechanism, so that factors affecting various types of loads requirements in IESs are more complex, and it is also more difficult to guarantee balanced supply requirements of various types of energy. In order to make an accurate short-term forecasting of the multi-energy loads in the IESs, the following method is proposed.

In a first aspect, the disclosure first provides a multi-energy integrated short-term load forecasting method. Referring to FIG. 1, the method includes:

S1. performing pretreatment and correlation calculation on acquired relevant data of multi-energy integrated short-term load forecasting to determine input data of a multi-energy integrated short-term load forecasting model, and performing sample classification on the input data; wherein the relevant data of multi-energy integrated short-term load forecasting includes multi-energy load historical data and external environment historical data corresponding to the multi-energy load historical data;

S2. acquiring a multi-energy integrated short-term load forecasting model constructed based on encoder-decoder; wherein the encoder includes multiple layers of temporal convolutional networks having multi-head self-attention mechanism and rotary position embedding;

S3. training the multi-energy integrated short-term load forecasting model based on the input data after the sample classification, and performing the multi-energy integrated short-term load forecasting by the trained multi-energy integrated short-term load forecasting model.

It can be seen that in the present embodiment, after obtaining the relevant data of multi-energy integrated short-term load forecasting, the sample classification data is used to train the multi-energy integrated short-term load forecasting model with multiple layers of temporal convolutional networks having multi-head self-attention mechanism and rotary position embedding, and finally the trained model is used to carry out the multi-energy integrated short-term load forecasting. The present embodiment can fully mine the coupling feature between multi-energy loads, improve the accuracy of multi-energy integrated short-term load forecasting, and further improve the management level and service efficiency of integrated energy demand side.

The implementation process of an embodiment of the present disclosure will be described in detail with reference to FIG. 1 and the explanation of the specific steps of S1-S3. Referring to FIG. 1, the specific process of a multi-energy integrated short-term load forecasting method in this embodiment is as follows:

This embodiment takes the three energy loads of water, electricity, and gas (that is, multi-energy load) as an example, and uses the data of the past 7 days to forecast the hourly multi-energy load data of the next 7 days, i.e., the forecasting step length is 168 (24 h*7). The specific steps of the multi-energy integrated short-term load forecasting method in this embodiment are as follows:

S1. Pretreatment and correlation calculation are performed on acquired relevant data of multi-energy integrated short-term load forecasting to determine input data of a multi-energy integrated short-term load forecasting model, and sample classification is performed on the input data. The relevant data of multi-energy integrated short-term load forecasting includes multi-energy load historical data and external environment historical data corresponding to the multi-energy load historical data.

1) The relevant data of multi-energy integrated short-term load forecasting is acquired. The relevant data includes multi-energy load historical data and external environment historical data corresponding to the multi-energy load historical data. In the present embodiment, among the selected relevant data, the external environment historical data provided by the weather station is sufficient, with a total of 12 variables, including temperature, humidity, wind speed, etc.

2) The pretreatment is performed on the multi-energy load historical data and external environment historical data. The operations such as missing value filling and normalization processing are performed on the multi-energy load historical data and the external environment historical data. After pre-cleaning the historical data of multi-energy loads and filling the missing values, all the multi-energy load historical data is sorted into a data set with a time interval of 1 h to form the multi-energy load historical data. For the missing external environmental historical data, such as temperature, humidity, and wind speed, measures need to be taken to make up for the missing values of these meteorological data, and the external environmental historical data sequence can be obtained after pretreating operations such as missing value filling and normalization processing.

3) A correlation coefficient of the multi-energy load historical data sequence is calculated to determine the input data of the multi-energy integrated short-term load forecasting model. Specifically, a correlation inside the multi-energy load historical data sequence and a correlation between the multi-energy load historical data and the external environment historical data are compared. If the correlation inside the multi-energy load historical data sequence is greater than the correlation between the multi-energy load historical data and the external environment historical data, the multi-energy load historical data sequence is used as an input only. On the contrary, if the correlation inside the multi-energy load historical data sequence is greater than 0.2 but less than the correlation between the multi-energy load historical data and the external environment historical data, then the multi-energy load historical data sequence and the external environment historical data sequence are simultaneously used as inputs of the multi-energy integrated short-term load forecasting. In this embodiment, Pearson correlation coefficient is selected for correlation evaluation, and then the environmental variables with coefficient less than 0.2 are selected and discarded. In this embodiment, the final selected input variables include electric power load, gas load, water load, the temperature, and humidity data of the corresponding period.

4) The above pretreated input data are classified into a training set, a validation set and a test set. In this embodiment, the data set is divided into training set, validation set and test set according to the proportion of 70%, 20%, and 10% respectively.

S2. A multi-energy integrated short-term load forecasting model constructed based on encoder-decoder is acquired. The encoder includes multiple layers of temporal convolutional networks having multi-head self-attention mechanism and rotary position embedding.

The multi-energy integrated short-term load forecasting model provided by the present embodiment is constructed based on encoder-decoder, and the encoder is used to extract the input feature of the input data of multi-energy integrated short-term load forecasting. The encoder is composed of multiple layers of temporal convolutional networks having multi-head self-attention mechanism and rotary position embedding.

S21. The input data of multi-energy integrated short-term load forecasting is converted into a feature matrix.

In the network embedding layer of the multi-energy integrated short-term load forecasting model, the input data of multi-energy integrated short-term load forecasting is converted into a feature matrix, which represents the numerical information and time information of the input data, and the feature matrix of the input sequence X= $\{x_0, x_1, \ldots, x_t\}$ is obtained based on the input data. In this embodiment, the input sequence is X=$\{x_0, x_1, \ldots, x_{168}\}$, and the dimension of the feature matrix is $L_x \times 512$.

The representation of numerical information in the feature matrix means that the input variable $$x_t^i$$

is encoded as a vector $$u_t^i$$

of d=512 dimensions by converting the input data vector into a matrix through convolution. The representation of time information refers to encoding the time corresponding to each group of multi-energy load historical data in the input sequence into time vector according to date, time, working day or not. Specifically, in the embedding layer, each global timestamp is embedded by $SE_{(L_x \times (t-1)+i)}$. Finally, the numerical information and time information of the input data are integrated as follows:

$$X_t^i = \alpha u_t^i + SE_{(L_x \times (t-1)+i)},$$

wherein, $i \in \{1, \ldots, L_x\}$, $L_x$ is the dimension of the input variable, $\alpha$ is the coefficient to balance the size between scalar projection and local/global embedded data. After the embedding layer feature encoding, the input sequence X=$\{x_0, x_1, \ldots, x_t\}$ is shaped into a set of feature matrices $X^{en}=\{X_1^{en}, X_2^{en}, \ldots, X_t^{en}\}$, where $$X_j^{en} = \left(X_j^1, X_j^2, \ldots, X_j^{L_x}\right) \in \square^{L_x \times d}, j \in \{1, \ldots, t\}.$$

In this embodiment, $i \in \{1, \ldots, L_X\}$ is $i \in \{1,2,3,4,5\}$. After passing through the embedding layer, the input sequence X=$\{x_0, x_1, \ldots, x_{168}\}$ is shaped into a set $$X^{en}, X_t^{en} = \left(X_t^1, \ X_t^2, \ X_t^3, \ X_t^4, \ X_t^5\right) \in \square^{5 \times 512}.$$

S22. The encoder is constructed by temporal convolutional networks having self-attention mechanism and rotary position embedding, and based on the encoder, a coupling feature of the input data of multi-energy integrated short-term load forecasting mining is mined.

An encoder is constructed based on the temporal convolutional networks having multi-head self-attention mechanism. The encoder is used to extract the hidden features of the feature matrix, that is, the coupling information features between data. When constructing the encoder, this embodiment extracts the features of the input data (feature matrix) by stacking the coding layers of the L temporal convolutional networks (TCN), where the expansion coefficient $r=2^l$. In addition, each encoding layer also contains the multi-head attention mechanisms for feature extraction, that is, multiple attention mechanisms for parallel operation. In particular, in order to extract the coupling features of the multi-energy load historical data sequence, this embodiment introduces multi-head self-attention mechanism with rotary position embedding into TCN under the encoder-decoder deep learning framework to improve the forecasting effect of multi-energy load forecasting model, where the encoder reads the feature matrix $$X_j^{en} \in X^{en}$$

and encodes it into a vector with fixed dimensions H, and $$H = f\left(X_j^{en}\right)$$

is the encoding state of the vector $$X_j^{en} = \left(X_j^1, X_j^2, \ldots, X_j^n\right) \in \square^{n \times d}, j \in \{1, \ldots, t\}.$$

In this embodiment, when constructing the encoder, the input features are extracted by stacking the L=3 of encoding layers of TCNs, and each encoding layer also contains a multi-head self-attention mechanism for feature extraction. The encoder reads the input feature matrix $$X_i \in \{X_1^{en}, X_2^{en}, \ldots, X_t^{en}\}$$

and encodes it into a vector H with 512 dimensions, and $$H = f\left(X_j^{en}\right)$$

is the encoding state of the vector $$X_j^{en} = \left(X_j^1, X_j^2, X_j^3, X_j^4, X_j^5\right) \in \square^{5 \times 512}.$$

The specific encoding process is as follows:

S211. An attention matrix is constructed based on the feature matrix, and the attention matrix includes query matrix, key matrix and value matrix.

In the self-attention mechanism, three matrices, Q, K, and V are obtained through the following operations based on the feature matrix:

$$[Q \quad K \quad V] = [X_t \quad X_t \quad X_t]^T [W_Q \quad W_K \quad W_V],$$

wherein, $$Q \in \square^{L_Q \times d}, K \in \square^{L_K \times d}, \text{ and } V \in \square^{L \times d}$$

respectively represents the query matrix, key matrix and value matrix, $$W_Q \in \square^{d \times d}, W_K \in \square^{d \times d}, \text{ and } W_V \in \square^{d \times d}$$

respectively represents the weight parameter matrix of the query matrix, key matrix and value matrix. In this embodiment, when L=3, the query matrix, key matrix, and value matrix are $$Q \in \square^{5 \times 512}, K \in \square^{5 \times 512}, \text{ and } V \in \square^{5 \times 12}$$

respectively; the weight matrices of query matrix, key matrix and value matrix are $$W_Q \in \square^{512 \times 512}, W_K \in \square^{512 \times 512}, \text{ and } W_V \in \square^{512 \times 512},$$

respectively. In addition, during parameter initialization in this embodiment, the weight parameters are randomly initialized.

S222. Rotary position embedding is added to the query matrix and the key matrix.

Rotary position embedding is added to the attention matrix to identify the specific position of the feature. Specifically, in this embodiment, when d=512, the attention mechanism with rotary position embedding is applied to both the query matrix and the key matrix in the following way:

$$f_q(X_m W_Q, m) = R_{\Theta,m}^d X_m W_Q = R_{\Theta,m}^{512} X_m W_Q,$$

$$f_k(X_n W_K, n) = R_{\Theta,n}^d X_n W_K = R_{\Theta,n}^{512} X_n W_K,$$

wherein, $$R_{\Theta,m}^d = \begin{bmatrix} M_1 & & & \\ & M_2 & & \\ & & \ddots & \\ & & & M_{d/2} \end{bmatrix} = R_{\Theta,m}^{512} = \begin{bmatrix} M_1 & & & \\ & M_2 & & \\ & & \ddots & \\ & & & M_{512/2} \end{bmatrix}.$$

And the elements $M_r$ in the $R_{\ominus,m}^d$ is:

$$M_r = \begin{bmatrix} \cos m\theta_r & -\sin m\theta_r \\ \sin m\theta_r & \cos m\theta_r \end{bmatrix}$$

and $$\Theta = \left\{\theta_r = 10000^{-2(r-1)/d}, r \in [1, 2, \ldots, d/2]\right\} =$$

$$\left\{\theta_r = 10000^{-2(r-1)/512}, r \in [1, 2, \ldots, 512/2]\right\}, \text{ and } f_{q,k}(\cdot)(\text{i.e., } f_q \text{ and } f_k)$$

is the function that combines the respective position information m and n into the input feature.

S223. An attention score between the query matrix and the key matrix after adding rotary position embedding is calculated.

The attention score is calculated based on the attention matrix with position information. The attention score $(A_{i,j})$ between the i-th query element and the j-th key element is calculated as:

$$A_{i,j} = \left(Q_p K_p^T\right)_{i,j} = \left([f_q(X_m W_Q, m)][f_k(X_n W_K, n)]^T\right)_{i,j},$$

wherein, $Q_p$ and $K_p$ are the query matrix and key matrix with position information respectively.

S224. The query matrix is updated according to a sparsity measure of the query matrix to obtain an attention query matrix.

The sparsity measure of the query attention matrix is the attention matrix with large query weight (that is, large attention score). The weight parameter with the best score ranking is retained, and the other parameters are replaced by the parameters corresponding to the global average score. In this embodiment, the weight parameters of the top 96 scores are retained, and the rest are replaced by the weight parameters corresponding to the global average score. Specifically, the attention query matrix $\overline{Q}$ is obtained by calculating the sparsity $\overline{M}(q_i, K)$ of the query matrix in the following way:

$$\overline{M}(q_i, K) = \max_j \left\{ \frac{q_j k_j^T}{\sqrt{d}} \right\} - \frac{1}{L_K} \sum_{j=1}^{L_K} \frac{q_j k_j^T}{\sqrt{d}},$$

wherein, the attention query matrix $\overline{Q}$ has the same size as the query matrix Q, but $\overline{Q}$ only contains the query results of the i-th query element $q_i$ under the maximum mean sparsity measure; $q_i$ represents an element in the query matrix Q.

S225. An attention mechanism is executed on the key matrix, the value matrix and the updated attention query matrix to mine the coupling feature of the input data of multi-energy integrated short-term load forecasting.

The attention mechanism is executed again on the attention matrix with large attention calculation score (i.e., large weight). The attention mechanism is executed in the following way:

$$A(Q_p, K, V) = \text{Softmax}\left( \frac{\overline{Q} K^T}{\sqrt{d}} \right) V.$$

S23. A redundant feature in the coupling feature is eliminated based on a distillation operation.

In order to eliminate the redundancy in the feature mapping V caused by the encoder after the multi-head attention mechanism, and thus eliminate the redundant feature caused by data expansion, the following distillation operation are performed between the j-th encoding layer and the (j+1)-th encoding layer (i.e., between every two encoding layers):

$$X_{t,j+1} = MaxPool(ELU(Conv1d([X_{t,j}]_{AB}))),$$

wherein, $$[x_{t,j}]_{AB}$$

represents the attention matrix after the above attention mechanism operation, and Conv1d($\cdot$) represents the execution of 1×1 convolution filter in the time dimension by ELU($\cdot$). All stacked outputs are connected through the expansion convolution of TCN, and the final output H of the encoder is obtained.

S24. A decoder is constructed. The decoder is arranged for obtaining an output data of multi-energy integrated short-term load forecasting after the coupling feature from which the redundant feature have been eliminated is decoded by the decoder.

The decoder is constructed. The decoder has two input sources: the feature matrix output by the encoder and the time sequence information to be forecasted. Through performing self-learning on the time sequence needing to be forecasted and performing cross learning on the time sequence and the feature matrix, the load sequence needing to be forecasted is decoded. In the decoding process, the decoder decodes H into target output sequence Y={$Y_0$, $Y_1$, . . . , $Y_t$}, measure the weight parameters of the feature map by combining the self-attention mechanism and the cross-attention mechanism, and generate the forecasting output elements in real time. Similar to the encoder, residual connection is used between each decoder, and then layer normalization is performed. The following vector is input to the decoder:

$$X_t^{de} = Concat\left(X_t^{token}, X_t^0\right) \in \square^{(L_{token}+L_y) \times d},$$

wherein, $$X_t^{token} \in \square^{L_{token} \times d}$$

is the starting mark of the decoder input, $$X_t^0 \in \square^{L_{token} \times d}$$

is the placeholder of the target sequence, and is initialized to 0.

In this embodiment, the number of layers of the decoder is set to 2, and the decoder is used to decode H into the target output sequence Y={$Y_0$, $Y_1$, . . . , $Y_{168}$}. Then the decoder input:

$$X_t^{de} = Concat\left(X_t^{token}, X_t^0\right) \in \square^{(L_{token}+L_y) \times d}$$
$$X_t^{de} = Concat\left(X_t^{token}, X_t^0\right) \in \square^{(84+168) \times 512},$$

wherein, the starting mark $$X_t^{token} \in \square^{L_{token} \times d}$$

of the decoder input is $$X_t^{token} \in \square^{84 \times 512},$$

and the placeholder $$X_t^0 \in \square^{L_{token} \times d}$$

of the target sequence is $$X_t^0 \in \square^{84 \times 512}.$$

S3. The multi-energy integrated short-term load forecasting model is trained based on the input data after the sample classification, and the multi-energy integrated short-term load forecasting is performed by using the trained multi-energy integrated short-term load forecasting model.

The encoder and decoder in the multi-energy integrated short-term load forecasting model are jointly trained. During training, the output of the encoder is also input into the decoder. After the decoder completes the output, the encoder and decoder are updated with parameters according to the output results. After the model is trained once with the data in the training set, the data of the validation set is used to forecast and save the model parameters and forecasting errors. In this way, the iteration is carried out and the forecasting errors are compared in the verification set each time. Finally, only the model parameters with the lowest error are retained. The model with the lowest error is used to test the forecasting accuracy of the model in the test set, and finally the conditional probability of the output sequence is maximized. In the model training, the loss function is taken as the optimization objective. This embodiment adopted mean square error (MSE) as the loss function:

$$MSE = \frac{1}{N} \sum_{i=1}^{N} (P_i - \hat{P}_i)^2.$$

In the present embodiment, $$MSE = \frac{1}{N} \sum_{i=1}^{N} (P_i - \hat{P}_i)^2 = MSE = \frac{1}{168} \sum_{i=1}^{168} (P_i - \hat{P}_i)^2,$$

wherein, $P_i$ is the true value of the actual short-term load; $\hat{P}_i$ is the forecasting value.

Considering that the performance of the Adam optimizer is good, the present embodiment chooses to apply the optimizer to the processed model training and iteratively correct the weight parameters until the forecasting error does not decline.

After the multi-energy integrated short-term load forecasting model is trained, the input data of multi-energy integrated short-term load forecasting can be input into the trained model to achieve the multi-energy integrated short-term load forecasting. The final result is the target output sequence $Y=\{Y_0, Y_1, \ldots, Y_t\}$ of short-term load forecasting value, in which $Y_0, Y_1, \ldots, Y_t$ corresponds to the hourly forecasting value of multi-energy integrated short-term load forecasting respectively.

So far, the whole process of the multi-energy integrated short-term load forecasting method has been completed.

In order to illustrate the effectiveness of the method in the present embodiment for the multi-energy integrated short-term load forecasting, the following experiments are carried out to prove it.

The forecasting results of single-energy load and multi-energy load are compared. In single-energy load forecasting, the input of the model does not consider the other two load factors. The root mean square error (RMSE) and mean square error (MSE) are used as the evaluation criteria of the forecasting model:

$$MSE = \frac{1}{168} \sum_{i=1}^{168} (P_i - \hat{P}_i)^2, RMSE = \sqrt{\frac{1}{168} \sum_{i=1}^{168} (P_i - \hat{P}_i)^2},$$

wherein, $P_i$ and $\hat{P}_i$ are actual load data and forecasting load data respectively. The comparison results are shown in Table 1:

TABLE 1

| Comparison of results of single-energy load forecasting and multi-energy load forecasting by the method in the present embodiment | | | | | | |
|---|---|---|---|---|---|---|
| | Electricity | | Gas | | Water | |
| Method | MSE | RMSE | MSE | RMSE | MSE | RMSE |
| Single-energy load forecasting | 1.0370 | 1.0183 | 0.6526 | 0.8078 | 0.5349 | 0.7314 |
| Multi-energy load forecasting | 0.9819 | 0.9828 | 0.6013 | 0.7754 | 0.5227 | 0.7230 |

It can be seen that the forecasting accuracy of load forecasting considering multi-energy coupling feature is better than that of single-energy load forecasting, and the method proposed in the present embodiment can obtain the forecasting results of all loads such as electricity, gas, and water. at one time, and the model training takes less time.

In order to verify the effectiveness of the multi-energy load short-term forecasting method in the present embodiment, the forecasting error of the current commonly used methods is selected as the main comparison index to compare the effects of the forecasting methods, as shown in Table 2 below:

TABLE 2

| Comparison of the results of multi-energy load forecasting between the method in the present embodiment and the existing conventional methods | | | | | | |
|---|---|---|---|---|---|---|
| | Electricity | | Gas | | Water | |
| Method | MSE | RMSE | MSE | RMSE | MSE | RMSE |
| TCN | 1.3560 | 1.1645 | 0.7225 | 0.8500 | 0.6981 | 0.8355 |
| Informer | 0.9704 | 0.9851 | 0.5531 | 0.7437 | 0.5702 | 0.7551 |
| Proposed | 0.9659 | 0.9828 | 0.6010 | 0.7753 | 0.5164 | 0.7186 |

It can be seen from the above table that the accuracy of the method proposed in the present embodiment is better than other methods for multi-energy load short-term forecasting.

Embodiment 2

In a second aspect, the disclosure also provides a multi-energy integrated short-term load forecasting system. Referring to FIG. 2, the system includes:

a data acquisition module, configured to acquire relevant data of multi-energy integrated short-term load forecasting, wherein the relevant data of multi-energy integrated short-term load forecasting includes multi-energy load historical data and external environment historical data corresponding to the multi-energy load historical data;

a data pretreating module, configured to perform pretreatment and correlation calculation on acquired relevant data of multi-energy integrated short-term load forecasting to determine input data of a multi-energy integrated short-term load forecasting model, and perform sample classification on the input data;

a forecasting model construction module, configured to acquire a multi-energy integrated short-term load forecasting model constructed based on encoder-decoder; wherein the multi-energy integrated short-term load forecasting model includes a feature encoding module and a feature decoding module, the feature encoding module includes performing time feature encoding, sequence position feature encoding and data feature encoding on the input data, performing feature learning by encoded matrixes, and outputting a feature matrix; the feature decoding module is used to decode a load sequence needing to be forecasted by performing self-learning on a time sequence needing to be forecasted and performing cross learning on the time sequence and the feature matrix; the encoder includes multiple layers of temporal convolutional networks having multi-head self-attention mechanism and rotary position embedding;

a model training module, configured to train the multi-energy integrated short-term load forecasting model based on the input data after sample classification; and a forecasting result output module, configured to perform multi-energy integrated short-term load forecasting by the trained multi-energy integrated short-term load forecasting model and output a forecasting result.

Optionally, a step of the data pretreating module performing pretreatment and correlation calculation on acquired relevant data of multi-energy integrated short-term load forecasting to determine input data of a multi-energy integrated short-term load forecasting model, and performing sample classification on the input data includes:

performing pretreatment on the multi-energy load historical data and the external environment historical data by a pretreating operation including a missing value filling and normalization processing;

calculating a correlation coefficient of the described pretreated multi-energy load historical data sequence to determine the input data of the multi-energy integrated short-term load forecasting model; and dividing the pretreated and correlation-calculated input data into a training set, a validation set, and a test set.

Optionally, the step of calculating a correlation coefficient of a sequence of the described pretreated multi-energy load historical data to determine the input data of the multi-energy integrated short-term load forecasting model includes:

performing correlation evaluation through Pearson correlation coefficient, comparing a correlation inside the multi-energy load historical data sequence and a correlation between the multi-energy load historical data and the external environment historical data, if the correlation inside the multi-energy load historical data sequence is greater than the correlation between the multi-energy load historical data and the external environment historical data, using the multi-energy load historical data sequence as an input only; on the contrary, if the correlation inside the multi-energy load historical data sequence is greater than 0.2 but less than the correlation between the multi-energy load historical data and the external environment historical data, then using the multi-energy load historical data sequence and the external environment historical data sequence simultaneously as inputs of the multi-energy integrated short-term load forecasting.

Optionally, the feature encoding module executes steps S21-S23:

S21. converting the input data of multi-energy integrated short-term load forecasting into a feature matrix;

S22. constructing the encoder by a temporal convolutional network having self-attention mechanism and rotary position embedding, and based on the encoder, mining a coupling feature of the input data of multi-energy integrated short-term load forecasting;

S23. eliminating a redundant feature in the coupling feature based on a distillation operation;

the feature decoding module executes step S24:

S24. obtaining an output data of multi-energy integrated short-term load forecasting after the coupling feature from which the redundant feature has been eliminated is decoded by the decoder.

Optionally, in S22, the constructing the encoder by a temporal convolutional network having self-attention mechanism and rotary position embedding, and based on the encoder, mining a coupling feature of the input data of multi-energy integrated short-term load forecasting includes:

S221. constructing an attention matrix based on the feature matrix, wherein the attention matrix includes query matrix, key matrix, and value matrix;

S222. adding rotary position embedding to the query matrix and the key matrix;

S223. calculating an attention score between the query matrix and the key matrix after adding rotary position embedding;

S224. updating the query matrix according to a sparsity measure of the query matrix to obtain an attention query matrix;

S225. executing an attention mechanism on the key matrix, the value matrix and the updated attention query matrix to mine the coupling feature of the input data of multi-energy integrated short-term load forecasting.

It is understandable that the multi-energy integrated short-term load forecasting method system provided by the embodiment of the disclosure corresponds to the above multi-energy integrated short-term load forecasting method, and the explanation, examples and beneficial effects of the relevant contents thereof may refer to the corresponding contents in the multi-energy integrated short-term load forecasting method, which will not be repeated here.

In conclusion, compared with the prior art, the present disclosure has the following beneficial effects:

1. In the disclosure, after classifying the acquired relevant data of multi-energy integrated short-term load forecasting, the data after sample classification is used to train the constructed multi-energy integrated short-term load forecasting model with multiple layers of temporal convolutional networks having multi-head self-attention mechanism and rotary position embedding, and finally the trained model is used to carry out the multi-energy integrated short-term load forecasting. The disclosure can fully mine the coupling feature between multi-energy loads, improve the accuracy of multi-energy integrated short-term load forecasting, and further improve the management level and service efficiency of integrated energy demand side.

2. The disclosure uses multiple layers of temporal convolutional networks having multi-head self-attention mechanism and rotary position embedding to construct an encoder (and construct a decoder accordingly), and then construct a multi-energy integrated short-term load forecasting model. The model can fully mine the coupling feature between multi-energy loads, solve the problem that the existing technology cannot carry out short-term accurate forecasting on multi-energy integrated load, and improve the accuracy of multi-energy load short-term forecasting.

3. The disclosure uses the correlation calculation as the selection index to determine the selection scheme of input features for the acquired relevant data of multi-energy integrated short-term load forecasting. By comparing the correlation coefficient between the multi-energy load and the environmental factors, the input features that can improve the multi-energy load short-term forecasting performance can be selected, and the accuracy of the multi-energy load short-term forecasting can be indirectly improved.

4. The disclosure extracts the coupling features between multi-energy loads and obtains the forecasting results of the multi-energy loads at one time. Compared with the single-energy load forecasting, it needs to build multiple forecasting models, and takes less time in the model training stage, so the method provided by the disclosure is more efficient.

5. The method of the disclosure not only realizes the short-term forecasting of multi-energy loads, but also can be applied on the ultra-short-term forecasting of multi-energy loads, with stronger universality.

It should be noted that, in this specification, relational terms such as first and second are only used to distinguish one entity or operation from another entity or operation, and do not require or imply any actual relationship or sequence between these entities or operations. Furthermore, the terms "comprise", "include", or any other variants thereof are intended to cover a non-exclusive inclusion, so that a process, a method, an article, or a device that includes a series of elements not only includes those elements, but also includes other elements that are not explicitly listed, or further includes elements inherent to the process, the method, the article, or the device. An element limited by "comprise a . . . " does not exclude other same elements existing in a process, a method, an article, or a device that includes the element, unless otherwise specified.

The foregoing embodiments are merely intended to illustrate the technical solutions of the present disclosure, but not to limit the present disclosure. Although the present disclosure is described in detail with reference to the foregoing embodiments, persons of ordinary skill in the art should understand that they can still make modifications to the technical solutions described in the foregoing embodiments or make equivalent replacements to some technical features thereof; these modifications or replacements do not make the essence of the corresponding technical solutions depart from the spirit and scope of the technical solutions of the embodiments of the present disclosure.

What is claimed is:

1. An electronic device, comprising:
one or more processors;
a memory; and
one or more programs, wherein the one or more programs are stored in the memory and configured to be executed by the one or more processors, and the programs may be configured to execute methods, comprising:
performing pretreatment and correlation calculation on acquired relevant data of multi-energy integrated short-term load forecasting to determine input data of a multi-energy integrated short-term load forecasting model, and performing sample classification on the input data;
wherein the relevant data of multi-energy integrated short-term load forecasting comprises multi-energy load historical data and external environment historical data corresponding to the multi-energy load historical data;
acquiring a multi-energy integrated short-term load forecasting model constructed based on encoder-decoder, wherein the encoder comprises a plurality of layers of temporal convolutional networks having multi-head self-attention mechanism and rotary position embedding; and training the multi-energy integrated short-term load forecasting model based on the input data after the sample classification, and performing the multi-energy integrated short-term load forecasting by using the trained multi-energy integrated short-term load forecasting model;

wherein the step of acquiring a multi-energy integrated short-term load forecasting model constructed based on encoder-decoder, wherein the encoder comprises a plurality of layers of temporal convolutional networks having multi-head self-attention mechanism and rotary position embedding comprises:

S21. converting the input data of multi-energy integrated short-term load forecasting into a feature matrix;

S22. constructing the encoder by a temporal convolutional network having self-attention mechanism and rotary position embedding, and based on the encoder, mining a coupling feature of the input data of multi-energy integrated short-term load forecasting;

S23. eliminating a redundant feature in the coupling feature based on a distillation operation;

S24. constructing a decoder, wherein the decoder is arranged for obtaining an output data of multi-energy integrated short-term load forecasting after the coupling feature from which the redundant feature has been eliminated is decoded by the decoder.

2. The electronic device of claim 1, wherein the step of performing pretreatment and correlation calculation on acquired data related to multi-energy integrated short-term load forecasting to determine input data of a multi-energy integrated short-term load forecasting model, and performing sample classification on the input data comprises:

performing pretreatment on the multi-energy load historical data and the external environment historical data by a pretreating operation comprising a missing value filling and normalization processing;

calculating a correlation coefficient of the described pretreated multi-energy load historical data sequence to determine the input data of the multi-energy integrated short-term load forecasting model; and dividing the pretreated and correlation-calculated input data into a training set, a validation set, and a test set.

3. The electronic device of claim 2, wherein the step of calculating a correlation coefficient of a sequence of the described pretreated multi-energy load historical data to determine the input data of the multi-energy integrated short-term load forecasting model comprises:

performing correlation evaluation through Pearson correlation coefficient, comparing a correlation inside the multi-energy load historical data sequence and a correlation between the multi-energy load historical data and the external environment historical data, if the correlation inside the multi-energy load historical data sequence is greater than the correlation between the multi-energy load historical data and the external environment historical data, using the multi-energy load historical data sequence as an input only; on the contrary, if the correlation inside the multi-energy load historical data sequence is greater than 0.2 but less than the correlation between the multi-energy load historical data and the external environment historical data, then using the multi-energy load historical data sequence and the external environment historical data sequence simultaneously as inputs of the multi-energy integrated short-term load forecasting.

4. The electronic device of claim 1, wherein in S22, the step of constructing the encoder by a temporal convolutional network having self-attention mechanism and rotary position embedding, and based on the encoder, mining a coupling feature of the input data of multi-energy integrated short-term load forecasting comprises:

S221. constructing an attention matrix based on the feature matrix, wherein the attention matrix comprises query matrix, key matrix and value matrix;

S222. adding rotary position embedding to the query matrix and the key matrix;

S223. calculating an attention score between the query matrix and the key matrix after adding rotary position embedding;

S224. updating the query matrix according to a sparsity measure of the query matrix to obtain an attention query matrix;

S225. executing an attention mechanism on the key matrix, the value matrix and the updated attention query matrix to mine the coupling feature of the input data of multi-energy integrated short-term load forecasting.

\* \* \* \* \*